US008529337B2

(12) United States Patent
Shechtman

(10) Patent No.: US 8,529,337 B2
(45) Date of Patent: Sep. 10, 2013

(54) ENHANCED PARIMUTUEL PLATFORM FOR WAGERING

(75) Inventor: Scott Shechtman, New York, NY (US)

(73) Assignee: Longitude LLC, New York, NY (US)

( * ) Notice: Subject to any disclaimer, the term of this patent is extended or adjusted under 35 U.S.C. 154(b) by 468 days.

(21) Appl. No.: 12/905,558

(22) Filed: Oct. 15, 2010

(65) Prior Publication Data

US 2011/0306409 A1 Dec. 15, 2011

Related U.S. Application Data

(60) Provisional application No. 61/353,712, filed on Jun. 11, 2010.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC ........ 463/25; 463/28

(58) Field of Classification Search
USPC ........ 463/25, 28
See application file for complete search history.

(56) References Cited

U.S. PATENT DOCUMENTS

| | | | |
|---|---|---|---|
| 4,903,201 | A | 2/1990 | Wagner |
| 5,101,353 | A | 3/1992 | Lupien et al. |
| 5,148,365 | A | 9/1992 | Dembo |
| 5,220,500 | A | 6/1993 | Baird et al. |
| 5,275,400 | A | 1/1994 | Weingardt et al. |
| 5,313,560 | A | 5/1994 | Maruoka et al. |
| 5,524,187 | A | 6/1996 | Feiner et al. |
| 5,564,701 | A | 10/1996 | Dettor |
| 5,573,244 | A | 11/1996 | Mindes |
| 5,608,620 | A | 3/1997 | Lundgren |
| 5,672,106 | A | 9/1997 | Orford et al. |
| 5,749,785 | A | 5/1998 | Rossides |
| 5,794,207 | A | 8/1998 | Walker et al. |
| 5,799,287 | A | 8/1998 | Dembo |
| 5,806,048 | A | 9/1998 | Kiron et al. |
| 5,819,237 | A | 10/1998 | Garman |
| 5,842,921 | A | 12/1998 | Mindes et al. |
| 5,845,266 | A | 12/1998 | Lupien et al. |
| 5,873,782 | A | 2/1999 | Hall |

(Continued)

FOREIGN PATENT DOCUMENTS

| | | |
|---|---|---|
| JP | 64-019496 U | 1/1989 |
| JP | 11-501423 | 2/1999 |

(Continued)

OTHER PUBLICATIONS

Shin, H., "Measuring the Incidence of Insider Trading in a Market for State-Contingent Claims," The Economic Journal, Sep. 1993, pp. 1141-1153, vol. 103, No. 420, Royal Economic Society.

(Continued)

*Primary Examiner* — William M. Brewster
(74) *Attorney, Agent, or Firm* — Kenyon & Kenyon LLP

(57) ABSTRACT

An enhanced parimutuel platform allows for the combination of multiple and single event wagers within a single pool, while maintaining payouts for the single event wagers that are independent of the multiple events. The enhanced parimutuel platform also allows for uniform payouts for wagers having a different number of outcomes for a single event, such as moneyline and point spread wagers.

27 Claims, 3 Drawing Sheets

(56) References Cited

U.S. PATENT DOCUMENTS

| | | | |
|---|---|---|---|
| 5,911,136 A | 6/1999 | Atkins | |
| 5,970,479 A | 10/1999 | Shepherd | |
| 6,061,662 A | 5/2000 | Makivic | |
| 6,085,175 A | 7/2000 | Gugel et al. | |
| 6,134,536 A | 10/2000 | Shepherd | |
| 6,247,000 B1 | 6/2001 | Hawkins et al. | |
| 6,263,321 B1 | 7/2001 | Daughtery, III | |
| 6,278,981 B1 | 8/2001 | Dembo et al. | |
| 6,317,728 B1 | 11/2001 | Kane | |
| 6,321,212 B1 | 11/2001 | Lange | |
| 6,336,103 B1 | 1/2002 | Baker | |
| 6,379,248 B1 | 4/2002 | Jorasch et al. | |
| 6,394,895 B1 | 5/2002 | Mino | |
| 6,408,282 B1 | 6/2002 | Buist | |
| 6,418,417 B1 | 7/2002 | Corby et al. | |
| 6,418,419 B1 | 7/2002 | Nieboer et al. | |
| 6,443,838 B1 | 9/2002 | Jaimet | |
| 6,456,982 B1 | 9/2002 | Pilipovic | |
| 6,468,156 B1 | 10/2002 | Hughs-Baird et al. | |
| 6,554,709 B1 | 4/2003 | Brenner et al. | |
| 6,594,643 B1 | 7/2003 | Freeny, Jr. | |
| 6,712,701 B1 | 3/2004 | Boylan, III et al. | |
| 7,020,632 B1 | 3/2006 | Kohls et al. | |
| 7,172,508 B2 | 2/2007 | Simon et al. | |
| 2001/0044767 A1 | 11/2001 | Madoff et al. | |
| 2001/0047291 A1 | 11/2001 | Garahi et al. | |
| 2001/0051540 A1 | 12/2001 | Hindman et al. | |
| 2002/0032644 A1 | 3/2002 | Corby et al. | |
| 2002/0052819 A1 | 5/2002 | Burton | |
| 2002/0073018 A1 | 6/2002 | Mulinder et al. | |
| 2002/0123954 A1 | 9/2002 | Hito | |
| 2004/0006528 A1 | 1/2004 | Kevin Fung | |
| 2004/0006529 A1 | 1/2004 | Fung | |
| 2004/0006534 A1 | 1/2004 | Fung | |
| 2004/0039670 A1 | 2/2004 | Fung | |
| 2004/0048656 A1* | 3/2004 | Krynicky | 463/25 |
| 2004/0054617 A1 | 3/2004 | Fung | |
| 2004/0153375 A1 | 8/2004 | Mukunya et al. | |

FOREIGN PATENT DOCUMENTS

| | | |
|---|---|---|
| WO | 9618162 A1 | 6/1996 |
| WO | 0008567 A1 | 2/2000 |
| WO | 0108063 A1 | 2/2001 |

OTHER PUBLICATIONS

Shin, H., "Optimal Betting Odds Against Insider Traders," The Economic Journal, Sep. 1991, pp. 1179-1185, vol. 101, Issue 408, Royal Economic Society.

Smith,T.R., "A Statistical Model for Characterizing Price Variability with Application to Dairy Investment Analysis," 1980, pp. 1-2.

Smithson, C.W., Managing Financial Risk: A Guide to Derivative Products, Financial Engineering and Value Maximization, Third Edition, McGraw-Hill Professional, 1998, pp. 34-38, 270-271 and 305-306.

Takahiro, W., "A Parimutuel System with Two Horses and a Continuum of Bettors," Journal of Mathematical Economics 28, pp. 85-100, 1997.

University of Iowa's Iowa Electronic Market (IEM) Trader's Manual, Aug. 1995, pp. 1-51, via http://web.archive.org/web/19970506020832/www.biz.uiowa.edu/iem/trman.txt.

U.S. Appl. No. 60/389,956, filed Jun. 20, 2002, application, including specification and drawings.

U.S. Appl. No. 60/442,462, filed Jan. 25, 2003, application, including specification, claims and abstract.

Watanabe, T., et al., 1994, "A Model of a General Parimutuel System: Characterizations and Equilibrium Selection," International Journal of Game Theory 23, pp. 237-260.

Weigel, E., "SuperUnits and SuperShares," Interfaces, May-Jun. 1994, pp. 62-79, vol. 24, No. 3, The Institute of Management Sciences.

Williams, L., "Information Efficiency In Betting Markets: A Survey," Bulletin of Economic Research, 1999, pp. 1-30, vol. 51, No. 1, Blackwell Publishers, Malden, MA.

Abraham Silberschatz and Peter B. Galvin, Operating System Concepts, 1994, Addison-Wesley Publishing Company, Inc., 4th edition, p. 20.

Ainslie, T., Ainslie's Complete Hoyle, 1975, Barnes and Noble Books by Simon and Schuster, Inc., p. 251.

Athanasoulis, S., et al., Macro Markets and Financial Security, FRBNY Economic Policy Review, Apr. 1999, pp. 21-39.

Bahra, B., "Implied Risk-Neutral Probability Density Functions From Option Prices: Theory and Application," Bank of England, 1997, ISSN 1368-5562.

Baron, K., et al., "From Horses to Hedging," Risk Magazine, Feb. 2003, pp. 73-77, vol. 16, No. 2, Risk Waters Group, Ltd., United Kingdom.

Billingsley, P., Probability and Measure, 1986, Second Edition, John Wiley and Sons, New York, pp. 16-26.

Bruce, A., et al., "Market Efficiency Analysis Requires a Sensitivity to Market Characteristics: Some Observations on a Recent Study of Betting Market Efficiency," Applied Economics Letters, 2000, pp. 199-202, No. 7, Taylor and Francis Ltd.

Bruce, A., et al., "Investigating the Roots of the Favourite-Longshot Bias: An Analysis of Decision Making by Supply- and Demand-Side Agents in Parallel Betting Markets," Journal of Behavioral Decision Making, 2000, pp. 413-430, vol. 13, Issue No. 4, John Wiley & Sons, Ltd.

Burns, G., "As the U. Of Iowa Goes, So Goes the Nation?" Business Week, New York, Nov. 11, 1996, Issue 3501, p. 118.

Burns, G., "The Election Futures Market: More Accurate than Polls?" Nov. 11, 1996, Business Week, 1-3.

Busche, K., et al., "Decision Costs and Betting Market Efficiency," Rationality and Society, 2000, pp. 477-492, vol. 12, No. 4, Sage Publications, Thousand Oaks, CA.

Cain, M., et al., "The Relationship between Two Indicators of Insider Trading in British Racetrack Betting," Economica, 2001, pp. 97-104, No. 68, The London School of Economics and Political Science.

Cain, M., et al., "The Incidence of Insider Trading in Betting Markets and the Gabriel and Marsden Anomaly," The Manchester School, Mar. 2001, pp. 197-207, vol. 69, No. 2, Blackwell Publishers Ltd., Malden, MA.

Dek, T., et al., "Optimal Betting and Efficiency in Parimutuel Betting Markets with Information Costs," The Economic Journal, Jul. 1996, pp. 846-863, vol. 106, No. 437, Blackwell Publishers, Malden, MA.

Economides, N. et al., "Electronic Call Market Trading," The Journal of Portfolio Management, Spring 1995, pp. 10-18.

Edelman, D.C., et al., "Tote Arbitrage and Lock Opportunities in Racetrack Betting," Working Paper, Oct. 17, 2001, pp. 1-8, Department of Accounting and Finance, University of Wollongong, Australia.

Eisenberg, E., "Consensus of Subjective Probabilities: The Pari-Mutuel Method," Annals of Mathematical Statistics, Mar. 1959, pp. 165-168, vol. 30, No. 1, Institute of Mathematical Statistics.

Evans, M., et al., Statistical Distributions, Second Edition, John Wiley & Sons, Inc., New York, pp. 140-141, 1993.

Fingleton, J., et al., "Optimal Determination of Bookmakers' Betting Odds: Theory and Tests," Jun. 1, 2001, pp. 1-36, Technical Paper No. 96/9, Trinity College, Dublin, Ireland.

Garbade, K. et al., 1979, "Structural Organization of Secondary Markets: Clearing Frequency, Dealer Activity, and Liquidity Risk," The Journal of Finance, vol. 34, No. 3, pp. 577-593.

Gu, S., et al., "Exchange Market Model for Over-the-Counter Equity Derivatives Trading," Working Paper, Oct. 9, 2001, pp. 1-29, Center for Research on Electronic Commerce, The University of Texas at Austin.

Hakansson, N., "Welfare Aspects of Options and Supershares," The Journal of Finance, Jun. 1978, pp. 759-776, vol. 33, No. 3.

Hanson, R., "Logarithmic Market Scoring Rules for Modular Combinatorial Information Aggregation," Working Paper, Jan. 2002, pp. 1-12, Department of Economics, George Mason University.

Haug, E.G., The Complete Guide to Options Pricing Formulas, 1998, McGraw-Hill, N.Y. p. 1.

Hausch, D., et al., Efficiency of Racetrack Betting Markets, 1994, Academic Press Inc., San Diego, CA.

Helenius, T., "Real Bonds, Real-time, Real Fast," Wall Street & Technology, New York, Apr. 1998, vol. 16, Issue 4, pp. 62-66.

Hong, S., "Japanese Investment Posts Strong Momentum," China Daily, New York, NY, Feb. 15, 1997, pp. "3-1" to "3-2".
Hurley, W.J., Winter 1998, "On the Use of Martingales in Monte Carlo Approaches to Multiperiod Parameter Uncertainty in Capital Investment Risk Analysis," The Engineering Economist, vol. 43, No. 2, pp. 169-182.
Ingersoll, J., Jr., "Digital Contracts: Simple Tools for Pricing Complex Derivatives," Journal of Business, 2000, pp. 67-88, vol. 73, No. 1, The University of Chicago, Chicago, IL.
Johnson, J., "An Empirical Study of the Impact of Complexity on Participation in Horserace Betting," Journal of Gambling Studies, Summer 1997, pp. 159-172, vol. 13, No. 2, Human Sciences Press, Inc.
Karp, J., "River Runs Dry: Big Hongkong Property Deal Falls Through," Far Eastern Economic Review, Hong Kong, Nov. 12, 1992, vol. 155, Issue 45, Starts on p. 69.
Lack of Debt Trades Stunts Market—HSBC, Businessworld, Manila, Sep.22, 1998, pp. 1-2.
Lange, L, et al., "A Parimutuel Market Microstructure for Contingent Claims Trading," Working Paper, Nov. 21, 2001, pp. 1-47, Stern School of Business, New York University, New York, NY.
Madhavan, A., "Trading Mechanisms in Securities Market," The Journal of Finance, 1992, vol. 47, No. 2, pp. 607-641.
Merton, R., "Continuous-Time Finance," Basil Blackwell, Inc., 1990, Cambridge, Massachusetts, pp. 441-457.
Mintz, S.L., "Measuring up: What CEOs Look for in their Chief Financial Officers," CFO, Boston, MA, Feb. 1994, vol. 10, Issue 2, pp. 28-32.
Narsing, A., et al., "Constrained Moments Simulation of Healthcare Capital Acquisitions," IEEE, 1997, New York, NY, USA, Portland International Conference on Management of Engineering Technology, p. 768.
Owen, G., "Parimutuel as a System of Aggregation of Information," Game Theoretical Applications to Economics and Operations Research, 1997, pp. 183-195, Kluwer Academic Publishers, The Netherlands.
Pagano, M., et al., Jun. 1996, "Transparency and Liquidity: A Comparison of Auction and Dealer Markets with Informed Trading," The Journal of Finance, vol. 51, No. 2, pp. 579-611.
Parker, K., Derivatives Offer Opportunity for the Small-Time Trader, The Vancouver Sun, Vancouver, B.C.: Apr. 10, 1995, pp. 1-2.
Pedersen, C.S., "Derivatives and Downside Risk," Derivatives Use, Trading & Regulation, 2001, pp. 251-268, vol. 7, No. 3, London.
Peel, D., et al., "Product Bundling and a Rule of Thumb versus the Harville Formulae: Can Each Way Bets with UK Bookmakers Generate Abnormal Returns," Applied Economics, 2000, pp. 1737-1744, No. 32, Taylor & Francis Ltd.
Phatarfod, R., "Betting Strategies in Horse Races," Asia-Pacific Journal of Operational Research, 1999, pp. 87-98, No. 16.
Plott, C.R., et al., "Parimutuel Betting Markets As Information Aggregation Devices: Experimental Results," Caltech Social Science Working Paper 986, Apr. 1997, pp. 1-58.
Randhawa, S.U., et al., "Financial Risk Analysis Using Financial Risk Simulation Prog," Industrial Management, Norcross, Sep./Oct. 1993, vol. 35, Issue 5, pp. 24-27.
Rhoda, K., et al., "Risk Preferences and Information Flows in Racetrack Betting Markets," The Journal of Financial Research, Fall 1999, pp. 265-285, vol. 22, No. 3.
Rubinstein, M., "Supershares," Handbook of Equity Derivatives, 1994, pp. 1-14, Irwin.
Saatcioglu, K., et al., "Design of a Financial Portal," Communications of the ACM, Jun. 2001, pp. 33-38, vol. 44, No. 6.
Schnitzlein, C., "Call and Continuous Trading Mechanisms Under Asymmetric Information: An Experimental Investigation," The Journal of Finance, Jun. 1996, vol. 51, No. 2, pp. 613-636.
Schwartz, R.A., "Integrating Call and Continuous Markets," Securities Traders' Monthly, Sep. 1991, pp. 14-16.
Shapley, L., et al., 1977, Trade Using One Commodity as a Means of Payment, Journal of Political Economy, vol. 85, No. 1, pp. 937-968.

* cited by examiner

ENHANCED PARIMUTUEL PLATFORM FOR WAGERING

CROSS-REFERENCE TO RELATED APPLICATIONS

This application claims the benefit, under 35 U.S.C. §119 (e), of U.S. Provisional Patent Application No. 61/353,712, filed on Jun. 11, 2010, entitled "Enhanced Parimutuel Platform For Wagering," which is herein incorporated by reference in its entirety.

FIELD OF THE INVENTION

The present invention relates to a platform developed to allow for trading in events, for example, which have no underlying cash market. The present invention further relates to parimutuel platforms for sports book and non-sports-book event wagering that allow for uniform payouts for single and multiple events in a single pool.

BACKGROUND INFORMATION

Parimutuel betting systems allow for a combination of bets taken for an event to be put in a single pool. Unlike other win/lose wagering systems, such as fixed-odd betting, in parimutuel systems, the payout is not determined until the pool is closed, which typically occurs when or shortly before the event begins. Parimutuel betting systems are designed around shifting odds, which are continually changing until betting for an event ends. Each payout for each individual bet is determined as a share of all the available bet amounts in the pool. A winning wager in a parimutuel system receives a payout from the portion of the pool that is made available to pay winning wagers (as opposed to being kept by the casino), which payout is proportional to the ratio of the amount of money wagered by the individual to the overall amount wagered by the winning bets.

In parimutuel betting systems, the role of and risk to the operators (the "house"), which may be, for example, a casino, sportsbook organization, racetrack operator, or the like, is minimized because bettors are placing wagers against other bettors, rather than against the house. Thus, parimutuel systems may eliminate any tangible risk for the house, allowing the house to simply take a cut of the entire betting pool without regard to the outcome of the event, such as an athletic competition, on which the wagers are placed.

In some betting systems, bettors are given the option of betting a point spread, where a team is favored by a fixed number of points over another team. Point spreads can be construed by a bettor as a predictor of victory, and also serves to equalize placed bets on either game participant. For example, a team may be favored, with respect to a game, by 5 points over its opponent. Betting a point spread can have multiple outcomes: a team wins and covers the point spread, a team wins and does not cover the point spread, a team loses a close game to cover the point spread, or a team loses and does not cover the point spread. Traditional parimutuel systems would not allow for combining point spread bets with bets specifying a team selected to win without specifying a point spread ("picking straight up" or "moneyline") into a single pool, as point spread bets have more outcomes than straight bets, and, unlike straight bets, have winning outcomes which are not mutually exclusive. Traditionally, point spread bets are not made using parimutuel systems. Thus, there additionally remains a need for a parimutuel system that may accommodate point spread wagers in a single pool, thereby removing any additional risk to the house.

SUMMARY OF THE INVENTION

Example embodiments of the present invention provide for a parimutuel betting platform that combines single event wagers and multiple event wagers into a single pool. By aggregating different bet types into a single pool, the system significantly improves odds on long-shots and, particularly considering the increased size of the pool, the ability to accommodate large size wagers.

The system and method may combine single event wagers and multiple event wagers, and may split a bettor's wager evenly across a set of wager outcomes that relate to the event upon which the bettor placed the wager. According to such an embodiment, discrepancies between the odds for each of the possible outcomes in which the bettor may win may be ignored, resulting in a payout to a single event bettor that may vary depending on the outcome of events upon which the bettor has not placed a wager. In such a system for example, the wager of a bettor who is concerned with only an outcome of Event A, can be combined with wagers that concern the outcomes of Event A, B, and C. Even if Event A ends favorably for the bettor, different odds exist depending on the outcomes of Events B and C, and thus the bettor's payout is dependent on the outcomes of Events B and C. Thus, a bettor who only desires a particular outcome for A, and whose wager is split evenly across all possible outcomes of Events B and C with a favorable outcome for Event A, receives different payouts for different results of events upon which the bettor did not wager.

Other example embodiments of the present invention may allow for the bettor to receive a uniform payout for Event A regardless of the outcomes of Events B and C. For example, the system and method may combine event wagers and multiple event wagers, while still allowing for uniform payouts for the single event wagers which are independent of other events, for example by allocating different portions of the placed wager to the different possible favorable outcomes of the wager. According to this embodiment, the odds and subsequent payout of a bettor who makes a wager on an outcome of a single event is no longer affected by others who may have made parlay-like bets across multiple events. Accordingly, example embodiments of the present invention further provide functionality to prevent a payout for a single event wager to be influenced by events upon which a bettor has not placed a wager, and provide uniform payouts for all favorable outcomes for the single event. Example embodiments of the present invention also provide for combining wagers having a diverging number of favorable outcomes into one pool, while maintaining a uniform payout for all favorable outcomes for any placed wager.

Example embodiments of the present invention are directed to one or more processors, which may be implemented using conventional processing circuits or devices or combinations thereof, e.g., a central processing unit (CPU) of a personal computer (PC) or other workstation processor. The processor(s) may execute code provided, e.g., on a hardware computer-readable medium including a memory device, to perform one or more, e.g., all, of the methods described herein, alone or in combination. The one or more processors may be embodied in a server and/or user terminal. The user terminal may be embodied, for example, as a desktop, laptop, hand-held device, personal digital assistant (PDA), television set-top Internet appliance, mobile telephone, smart phone, iPod, iPhone, iPad, etc., or as a combination of one or more thereof. The memory device may include any conventional permanent and/or temporary memory circuits or combination thereof, a non-exhaustive list of which includes random access memory (RAM), read only memory (ROM), compact disks (CD), digital versatile disk (DVD), and magnetic tape. Such devices may be used, for example, for placing wagers, receiving wagers, allocating wagers, and/or allocating payouts for wagers.

Example embodiments of the present invention provide one or more hardware computer-readable media, e.g., as described above, having stored thereon instructions executable by one or more processors, such as those described above, to perform one or more, e.g., all, of the methods described herein, alone or in combination.

Example embodiments of the present invention provide a hardware component or machine that transmits instructions executable by one or more processors, such as those described above, to perform one or more, e.g., all, of the methods described herein.

A processor may determine, for each of a plurality of favorable outcomes corresponding to a placed wager, a respective portion of an amount wagered by the single event wager, such that a return on the respective portions for each of the favorable outcomes is the same, and accordingly allocate the determined portions of the wager amount to the respective favorable outcomes. After the determined portions have been allocated, the processor may iteratively re-determine the respective portions for each of the favorable outcomes and reallocate the determined portions of the wagers to the favorable outcomes until an equilibrium is reached. The equilibrium may be reached, where no reallocation of portions of the amounts wagered is required for any of the wagers in the single pool.

In an embodiment where single event wagers may be received, for allocating portions of a wagered amount to a plurality of outcomes, the processor may perform an iterative calculation in which the single event wager is initially allocated based on a degree of similarity between odds of different ones of the favorable outcomes, the greater the similarity, the more even the allocation, and may subsequently iteratively modify the allocation until a uniform payout for each of the favorable outcomes is reached. When a new wager is received, the processor may initially allocate the new wager to favorable outcomes to which the new wager corresponds and then reallocate the single event wager in response to odds of the favorable outcomes shifting by the allocation of the new wager.

In an alternative example embodiment, an initial determination may be made as to whether an allocation of equal portions of the single event wager to each of the favorable outcomes provides different returns on the single event wager. If it is determined that equal allocation provides a uniform payout, the processor may refrain from performing any further iterative allocation.

In the embodiments of a single event parimutuel system, the processor may perform an iterative calculation where after the initial allocation is determined, the allocation is subsequently modified until an equilibrium is reached. The speed of the calculation may be dependent on the proximity of the initial allocation to a final allocation of the iterative calculation.

In an example embodiment of the present invention, a system and method may aggregate straight wagers and point spread wagers in a single pool. A processor may allocate portions of the straight wager to a plurality of favorable outcomes of a plurality of both straight and point spread wagers corresponding to the favorable outcome of the straight wager. Allocation may occur through an iterative process where wager amounts of one or more of the wagers in the pool to a respective set of favorable outcomes are reallocated until an equilibrium may be reached.

In this straight/point spread system, the processor may perform an iterative calculation in which the straight wager is initially allocated based on a degree of similarity between odds of different ones of the favorable point spread outcomes, the greater the similarity, the more even the allocation, and the allocation is subsequently iteratively modified until a uniform payout for each of the favorable point spread outcomes is reached. When a new wager is received, the processor may initially allocate the new wager to favorable point spread outcomes to which the wager corresponds and then reallocate the straight wager in response to odds of the favorable outcomes shifting because of the allocation of the new wager.

In the embodiments of a straight/point spread wager aggregated system, the processor may perform an iterative calculation where after the initial allocation is determined, the allocation is subsequently modified until an equilibrium is reached. The speed of the calculation may be dependent on the proximity of the initial allocation to a final allocation of the iterative calculation.

In both single event and point spread/straight bet systems, there may be instances where a parimutuel wager is only partially filled in order to satisfy specified limit odds, such that only a portion of the parimutuel wager is allocated by the processor to the respective set of favorable outcomes. The remainder of the parimutuel wager that does not satisfy the specified odds may be recorded in a data store for later reference thereto. When new bets are added to the pool, the remainder or a portion of the remainder of the parimutuel wager may be allocated by the processor to the respective set of favorable outcomes if the specified limit odds are satisfied with the allocation of the remainder (or portion thereof) in view of the newly added bets. Additionally, there may be instances where specified limits are such that they cannot be satisfied with allocation of any of the wager, in which case, the wager is not allocated at all. The wager, may be recorded for later allocation in response to a later shift in odds which can be satisfied with allocation of some or all of the wager, should such a shift in odds occur.

DETAILED DESCRIPTION

In example embodiments of the present invention, a parimutuel betting system and method may allocate a wager for a single event to a subset of wagers on multiple events that correspond to the placed wager, and may prevent discrepancies in payouts for the single event by reallocation of different portions of the wager across the various outcomes to achieve uniformity for payouts. Accordingly, the payout for the wager would not be dependent on outcomes of the other events in the pool upon which the bettor did not wager. Thus, example embodiments of the present invention may provide an enhanced parimutuel platform that reallocates a wager placed on a single event across outcomes for multiple events that are all impacted by the outcome for the single event upon which the wager was placed. This may allow for concurrent betting for single events and multiple event parlay-like bets within the same single pool without affecting the payout for the single event betting, and allow for the pool to remain in balance.

The present invention may provide a system that includes an automated parimutuel platform that performs wager reallocation and aggregation, which provides an efficient and cost-effective option to maintain uniform payouts. The system may continuously update the allocation in view of changing odds during a betting period, and may use complex allocation algorithms that are not practically performed manually. The present invention may also provide the additional benefit that it may accommodate large wagers, and maintain uniformity in the payouts. Further, due to the increased pool size by aggregation of various bet types, a result may be that large wagers do not cause as great a swing in the odds, as they would for smaller pools.

Figure 1:
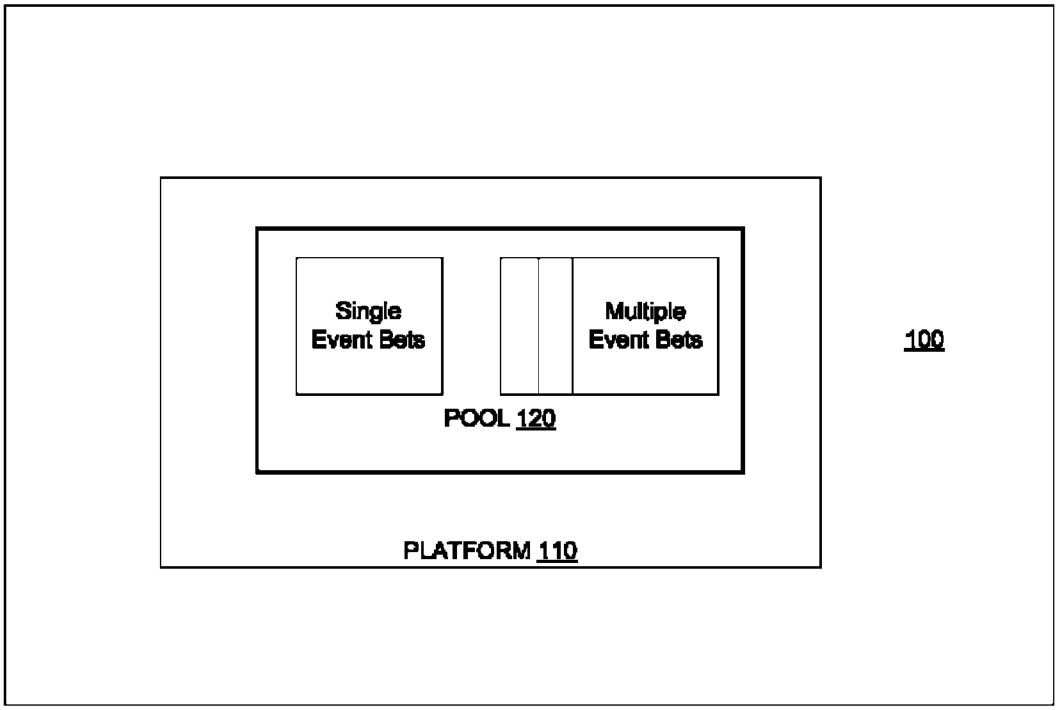
FIG. 1 is a diagram of an enhanced parimutuel platform, according to an example embodiment of the present invention.

FIG. 1 illustrates a computer system 100 that includes an enhanced parimutuel platform 110, according to an example embodiment of the present invention. The parimutuel platform 110 may be tailored towards a specific genre or sport, such as football or baseball, or may encompass multiple genres and sports. Although, for the purposes of this discussion, the parimutuel platform is described, by way of example, as being directed towards sports events, the enhanced parimutuel platform discussed herein may be used to enable trading or wagering in any event that does not have an underlying cash market.

Parimutuel platform 110 may store and update a data structure, pool 120, in which bets are recorded. Parimutuel platform 110 may collect bets on both a single event and those that depend on the outcome of a multiple of events ("parlay-like" bets), and combine each of those bets into a single pool 120. Parimutuel platform 110 may allow for betting on events that have binary or nonbinary payouts. In events having binary payouts, there are only two possible outcomes for that event. An example of an event that may have a binary payout may be a sports game in which the bettor may only wager on whether a specific team wins or loses. Other examples of events that may have binary payouts, are the temperature at a game being below a specific temperature, a quarterback throwing for more than a specific number of yards, and whether or not Wayne Newton will be elected the mayor of Tokyo by a specific date. Platform 110 may accommodate all of these events.

If a pool provides only for binary payouts, N may equal the number of separate events or games upon which a bettor may place a wager in pool 120 and the total number of outcomes may be $2^N$ in that pool. If a bettor only bets on the outcome of a single event, the total number of favorable outcomes to the bettor may be $$\frac{2^N}{2} \text{ or } 2^{N-1}.$$

Parimutuel platform 110 may also collect bets on events that do not have a binary payout. An example of a nonbinary payout would be a scenario in which the bettor is given the option to select whether a given team wins, loses, or covers the point spread in a game. The bettor may select the "cover the point spread" option, where a team is designated to win or lose by a certain number of points. In such a scenario, more than two outcomes may be possible, the total number of outcomes in the entire pool 120 possible may be, for example, $3^N$, and the number of favorable outcomes to the bettor may be, for example, $3^{N-1}$.

For all payouts, including binary and nonbinary payouts, the total number of outcomes possible in the pool may be $X^N$, where X is the total number of selectable options (i.e., a team winning, losing, or covering the point spread), and N is the total number of events (i.e., in the described example, games) that may be picked. The total number of favorable outcomes for a bettor who places a wager on a single game or event may be $X^{N-1}$.

If the wager of a bettor who places the wager on only the outcome of a single event is simply split evenly across each of the favorable outcomes for the bettor's event, then if $T_B$ is the total wager amount placed by the bettor, the amount split evenly across each favorable outcome would be $$\frac{T_B}{X^{N-1}}.$$

An even distribution of the wager may be problematic because other bettors placing wagers within pool 120 may have placed wagers on multiple outcomes depending on multiple events. If there is increased betting on certain parlay-like bets, for example a scenario in which all favored teams in 3 football games all win, a shift in the odds and payout may occur because of the heavy volume of betting on this outcome. Other outcomes may receive more favorable odds, such as a scenario in which one or more underdogs win in the 3 games. A bettor who simply bets on the outcome of one of the events (such as the winner of one of the football games) may find that although there are $X^{N-1}$ favorable outcomes, not all of the outcomes result in the same payout due to the shifting odds. This may create the unwanted outcome that a bettor of a single event finds the payout to be dependent on the outcome of events upon which the bettor did not lay a wager.

For example, if the pool 120 includes bets on a football game between the Giants and the Eagles, a football game between the Colts and the Patriots, and a football game between the Packers and the Vikings (as shown in Table 1), a bettor might wager only on the game between the Giants and the Eagles, betting that the Giants would win. If the wager is allocated evenly among all outcomes in which the Giants win, i.e., (1) the Giants, Colts, and Packers all win, (2) the Giants, Colts, and Vikings all win, (3) the Giants, Patriots, and Packers all win, and (4) the Giants, Patriots, and Vikings all win, then the payout the bettor receives upon the Giants winning would depend on the odds on the outcomes for the other games as well. For example, if more is bet on the Colts and Packers winning than the Patriots and Vikings winning, then the bettor would receive a larger payout if the Patriots and Vikings win than if the Colts and Packers win, even though the bettor did not wager on those games.

The following table shows eight outcomes for which the system and method may accept wagers or to which the system and method may allocate wagers for the three example games.

TABLE 1

| Outcome | Giants vs. Eagles Winner | Colts vs. Patriots Winner | Packers vs. Vikings Winner |
|---|---|---|---|
| 1 | Giants | Colts | Packers |
| 2 | Giants | Colts | Vikings |
| 3 | Giants | Patriots | Packers |
| 4 | Giants | Patriots | Vikings |
| 5 | Eagles | Colts | Packers |
| 6 | Eagles | Colts | Vikings |
| 7 | Eagles | Patriots | Packers |
| 8 | Eagles | Patriots | Vikings |

Figure 2:
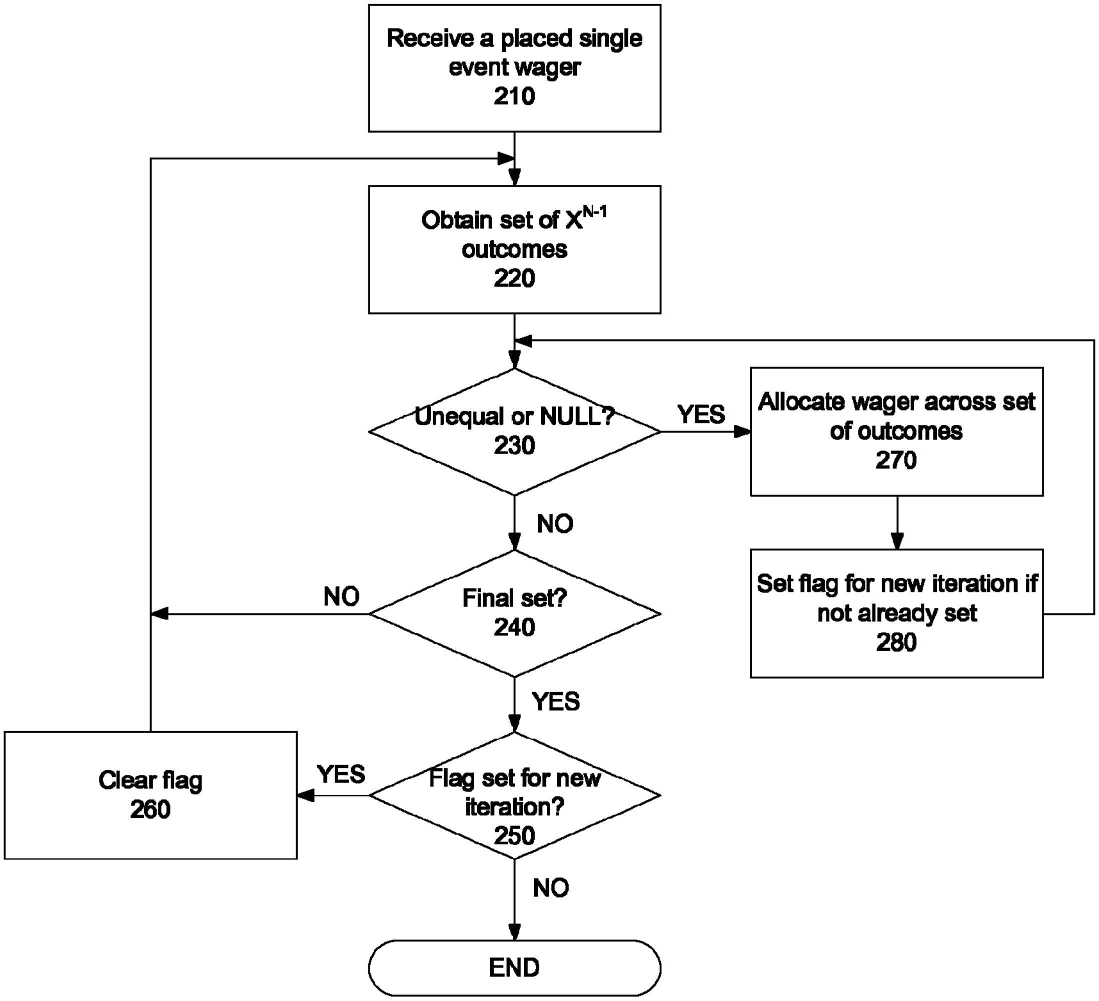
FIG. 2 is a flow diagram of reallocation of wagers for single event wagers in the parimutuel platform, according to an example embodiment of the present invention.

FIG. 2 is a flow diagram according to an example embodiment of the present invention that illustrates allocation by the parimutuel platform of a wager according to an algorithm such that the same payouts are provided across all outcomes that include the outcome on which the wager was placed. The system and method may receive parlay-like and single event wagers placed on various events in platform 110, and may aggregate the wagers into pool 120. At step 210, a new wager that is placed on a single event may be received by platform 110. At step 220, the system and method may determine for the individual wager $X^{N-1}$ corresponding favorable outcomes. Because the wager is newly received, an allocation of the wager to the determined outcomes is, at this point, NULL, leading to the "YES" branch of decision point 230. Accordingly, at step 270, the system and method may allocate the wager across all $X^{N-1}$ favorable outcomes to obtain a set of diminutive wagers for the single event wager. Pool 120 may contain a collection of sets of diminutive wagers, including the set corresponding to the newly received single event wager.

Payout odds for different ones of the $X^{N-1}$ outcomes may vary due to a heavy volume of betting or large wagers that have been made on specific events or parlay-like bets. Accordingly, the system may, at step 230, determine whether the outcomes in the set of diminutive wagers all have the same payout. If the outcomes in the set of diminutive wagers have an equal payout, platform 110 may proceed to step 240. If the outcomes in the set of diminutive wagers do not have an equal payout, the system and method may proceed again to step 270, where the wager is reallocated. After each performance of step 270, the system and method may proceed again to decision point 230 to determine whether the outcomes would provide equal payouts in view of the latest reallocation.

Allocation of the newly obtained wager to the various favorable outcomes to which it corresponds may cause a shift in odds that affects prior placed wagers. Accordingly, subsequent to step 270, the system and method may initially perform step 280 to set (if not already set) an internally stored flag indicating that a new iteration, during which to traverse all placed wagers to ensure that their respective corresponding sets of favorable outcomes produce equal payouts for the respective placed wagers, is to be performed.

Additionally, after it is determined at decision point 230, for the newly placed wager, that the allocation is such that the favorable outcomes produce equal payouts for the newly placed wager, the system and method may determine, at step 250, that the flag has been set, and therefore, return to step 220 to obtain from memory a stored set of $X^{N-1}$ outcomes and diminutive wagers corresponding to another recorded wager to similarly determine, at step 230, for the previously placed wager, whether the allocation of the wager to its respective set of favorable outcomes produces equal payouts. It is noted, that during a repeat performance of step 220 for a wager, the system need not re-determine which outcomes correspond to the wager, as they may already be recorded in memory, and may be retrieved from memory.

This may be repeated for all of the previously placed wagers. If, at step 240, the system determines that the final wager and corresponding set has been traversed, the system may determine whether the flag has been set in step 250. If the flag has been set, this indicates that a reallocation was performed in the latest traversal through the placed wagers, requiring a new traversal. Accordingly, the system may, at step 260, clear the flag and return to step 220, to begin a new iteration. If a reallocation (or a significant reallocation) does not take place in the next iteration, then the flag will not be reset in the next iteration, and, after the final set is traversed, as determined at step 240, the system may end the process, since an equilibrium has been reached. The iterative process may be restarted for each newly received wager during the betting period.

It is noted that in an example embodiment, the system may be configured such that step 280 is not performed upon an allocation for a newly placed wager in a first traversal through the wagers, because if none of the prior recorded wagers are reallocated based on the allocation of the newly placed wager, then there is no reason to perform a subsequent iteration through the recorded wagers.

Additionally, it is noted that, while the steps of FIG. 2 have been described as being performed immediately in response to receipt by the system of a wager, some or all of the steps may be performed instead at set periodic intervals and/or after receipt of a predefined number of wagers or of wagers specifying in total at least a predefined number of currency value units, and/or upon closing of the betting window. For example, performance of all of the steps may be limited to such instances. Alternatively, immediately upon receipt of a new wager, the wager may be allocated based on odds prevailing at the time of receipt of the new wager, but reallocation of prior wagers may be delayed until the next such predefined time.

As noted above, for each traversed wager, if platform 110 determines that the payout is not the same across all of the favorable outcomes for a traversed set, platform 110 may proceed to step 270 to reallocate portions of the individual single event wager until a uniform payout is reached across all of the favorable outcomes in the set. The allocation for providing the equal payouts may be performed such that, for each favorable outcome the following is true:

$$A_i = \frac{P}{O_i}, \qquad \text{(i)}$$

where P=the uniform payout (profit) for each of the favorable outcomes, $O_i$=the odds for a particular outcome, $A_i$=the amount allocated for a particular outcome.

In a parimutuel betting system, the payout odds for a particular outcome may be determined by the formula:

$$O_i = \frac{T_{POOL} - T_{OUT}}{T_{OUT}}, \qquad \text{(ii)}$$

where $T_{POOL}$=the total amount wagered in the entire pool and $T_{OUT}$=the total wagered on a particular outcome.

As the odds for each outcome may be dependent on the proportion of the total bet amounts that were bet on that particular outcome, the amount allocated to an outcome may thus also be dependent on the proportion of the total bet amounts that were bet on the outcome. Thus, the amount allocated for each favorable outcome may be:

$$A_i = \frac{P}{\frac{T_{POOL} - T_{OUT}}{T_{OUT}}}. \quad \text{(iii)}$$

In an example embodiment of the present invention, the system and method may perform an iterative process as described in U.S. patent application Ser. No. 10/640,656 ("the '656 application"), the entire content of which is hereby incorporated by reference herein, to determine the value of P and the value for $A_i$ for each of the outcomes. The iterative process is further represented by the set of equations 15.2.9A in the '656 application.

According to Equation (iii), a higher allocation amount is allocated for those of the outcomes upon which much more money had been wagered. For example, platform 110 may select an initial allocation and then reallocate the determined portions of the wager to the respective favorable outcomes until a uniform payout is reached. In each iteration, a degree of change to the allocation may be dependent upon the extent of the differences between payouts for the different outcomes in accordance with the allocation of the prior iteration. Platform 110 may converge faster to the final allocation of the iterative process if the initial allocation is chosen closer to the final allocation.

In an example embodiment of the present invention, the initial allocation of a newly received wager may be uniform. In an alternative example embodiment of the present invention, the initial allocation may be non-uniform, e.g., selected according to a degree of similarity between odds of different ones of the favorable outcomes. For example, if the odds (the payout per wagered value unit) for a first of the outcomes is greater than the odds for a second of the outcomes, then the processor may initially allocate more of the wager to the second of the outcomes than to the first of the outcomes. In an example embodiment of the present invention, if an allocation was previously determined for a prior placed wager corresponding to the same set of favorable outcomes as those to which a newly placed wager corresponds, the processor may select the allocation of the prior placed wager as the initial allocation for the iterative process in determining the allocation for the newly placed wager.

As the odds may continuously shift for each outcome until betting closes for an event, parimutuel systems continuously or periodically update or check that the payouts for an outcome remain in equilibrium. Each subsequent wager may cause a reallocation of every wager that came before it, e.g., except for those wagers which specified a single one of the defined outcomes and were therefore not distributed among a set of corresponding defined outcomes. In circumstances of a heavy volume of betting or a large amount bet on a particular outcome, odds will significantly change and may necessitate a significant reallocation. Therefore, after the new wager is allocated to outcomes of pool 120, the platform 110 may perform the iterative process described with respect to FIG. 2 to re-check that the allocation of wager amounts to the sets of diminutive wagers in pool 120 for the prior recorded wagers continue to produce equal payouts regardless of which of the corresponding favorable outcomes occurs. Equilibrium is found where the allocation amounts for each of the wagers in the respective diminutive sets containing the new wager remain unchanged (or substantially unchanged) in sequential iterations. If the payouts for all the $X^{N-1}$ favorable outcomes remain the same for each of the wagers, reallocation is not necessary and an equilibrium has been found.

It is noted that the system and method may accept a parlay-like wager on one of the defined outcomes. Since such a wager already selects one of the defined outcomes, allocation to a corresponding subset of outcomes is not performed for that wager (although reallocation of prior recorded wagers may be performed in response to the parlay-like wager on the single defined outcome, which may cause a shift in odds requiring such reallocation of the prior recorded wagers).

Continuing the example from Table 1 with the three corresponding football games, the following table shows an allocation of a new wager of $50 on the Giants winning. For the initial pool and, therefore, initial odds given by the table below, the system and method may allocate $20 of the $50 wager to outcome 1, and $10 of the $50 wager to each of outcomes 2 to 4 in order for the bettor to receive a $70 payout where the Giants win, regardless of which of outcomes 1 to 4 occur. As Table 2 shows, the allocation changes the odds, which may give rise to further reallocations for other bets as described above. Outcomes that have a lower payout ratio may require a higher amount allocated on that particular outcome to maintain the same payout as those of longshot outcomes.

TABLE 2

| Outcome | Initial Pool | Initial Odds | Split of New Bet | New Pool | New Odds | Payout for New bet | Total Payout |
|---|---|---|---|---|---|---|---|
| 1 | $20 | 7:2 | $20 | $40 | 5:2 | $70 | $140 |
| 2 | $10 | 8:1 | $10 | $20 | 6:1 | $70 | $140 |
| 3 | $10 | 8:1 | $10 | $20 | 6:1 | $70 | $140 |
| 4 | $10 | 8:1 | $10 | $20 | 6:1 | $70 | $140 |
| 5 | $10 | 8:1 | $0 | $10 | 13:1 | $0 | $140 |
| 6 | $10 | 8:1 | $0 | $10 | 13:1 | $0 | $140 |
| 7 | $10 | 8:1 | $0 | $10 | 13:1 | $0 | $140 |
| 8 | $10 | 8:1 | $0 | $10 | 13:1 | $0 | $140 |
| Total | $90 | | $50 | $140 | | | |

The present invention may also allow for the combination of different types of bets having a different number of outcomes, into a common pool. In particular, in an example embodiment, platform 110 may receive wagers from bettors who wish to bet the point spread and from those wishing to bet straight up.

In conventional game wagering systems, a single point spread is set by an expected point differential. The only wagers that can then be made on the game are either those that either do not specify the point spread, but rather only specify a winner, or those that specify the single point spread. Unlike traditional parimutuel systems in which a bettor who believes that a team will win by significantly more than the point spread would not be allowed to lay a wager that rewards the bettor for predicting a less probable outcome, in the present invention, a bettor may choose the bettor's own point spread, and is rewarded with a payout that is commensurate with the improbability of the unlikely event occurring. Traditional parimutuel systems are not generally used for point spread betting and do not accommodate multiple point spreads for a single event. In particular, traditional parimutuel systems could not handle multiple point spreads for a single event because, for example, not enough bettors would take both sides of each of the point spreads.

For example, for a particular game, the system and method may store a data structure defining a set of discrete point spreads for each team of the contest, and may record wagers for any one or more of those defined point spreads. Each defined point spread may be a respective single point spread, e.g., 3 points, or may be a respective range of point spreads, e.g., between 3 and 5 points, or at least 30 points. The following table shows an example of point spreads which may be defined by the data structure maintained by the system, for a game between the Lakers and the Suns. Thirty point spreads are shown to be defined for each team, each defined point spread being a single point spread, except for one point spread which includes the range of all point spreads of at least 30 points.

TABLE 3

| Outcome | Final Score |
|---|---|
| 1 | Suns Win by 30+ |
| 2 | Suns Win by 29 |
| 3 | Suns Win by 28 |
| 4 | Suns Win by 27 |
| 5 | Suns Win by 26 |
| . . . Rows Omitted . . . | |
| 28 | Suns Win by 3 |
| 29 | Suns Win by 2 |
| 30 | Suns Win by 1 |
| 31 | Lakers Win by 1 |
| 32 | Lakers Win by 2 |
| 33 | Lakers Win by 3 |
| . . . Rows Omitted . . . | |
| 56 | Lakers Win by 26 |
| 57 | Lakers Win by 27 |
| 58 | Lakers Win by 28 |
| 59 | Lakers Win by 29 |
| 60 | Lakers Win by 30+ |

According to this example, for any one team winning, the system may record the outcome as thirty discreet outcomes. If bets are accepted on three games, as discussed above with respect to the example of the game between the Giants and the Eagles, the game between the Colts and the Patriots, and the game between the Packers and the Vikings, and if thirty point spreads for which to accept wagers are provided for each team, then the number of outcomes is actually $30^3 \times 8$, instead of the eight described above with respect to Table 1.

Accordingly, with respect to even a single contest, a wager from a bettor who simply wishes to select the winner of the contest after a number of point spread wagers had previously been received by platform 110, the system and method may treat any point spread outcome that has the selected team winning as a favorable outcome to which a portion of the new wager may be allocated. Evenly splitting the straight bet across all the favorable point spread outcomes may again create an issue with uneven payouts across favorable outcomes due to shifting odds, making the straight bettor dependent on the point spread despite the fact that the bettor never made any wager against the point spread. A less likely outcome, such as a large margin of victory by one team for example, may result in a higher payout.

Accordingly, the system and method, according to an example embodiment of the present invention, may allocate different percentages of the wager to the different corresponding outcomes, such that a uniform payout is made regardless of which of the corresponding outcomes occurs.

Figure 3:
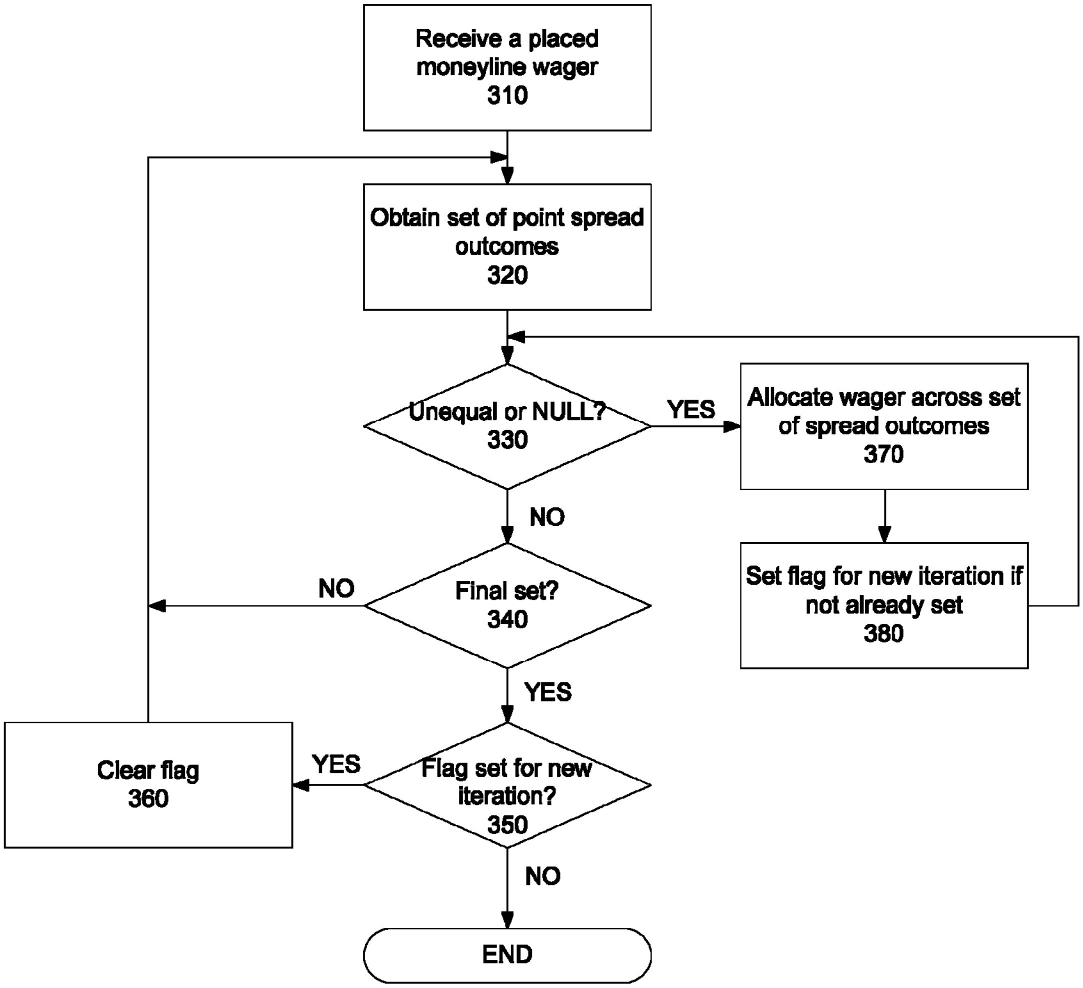
FIG. 3 is a flow diagram of reallocation of wagers for straight wagers in the parimutuel platform, according to an example embodiment of the present invention.

FIG. 3 is a flow diagram according to an example embodiment of the present invention that illustrates allocation by the parimutuel platform of a placed straight wager according to an algorithm such that the same payouts are provided across all outcomes that include the outcome on which the straight wager was placed. The system and method may receive straight wagers and point spread wagers placed on various events in platform 110, and may aggregate the wagers into pool 120. At step 310, a new straight wager that is placed on an event may be received by platform 110. At step 320, the system and method may determine for the straight wager, corresponding favorable outcomes for a corresponding set of predefined point spread wager types. Because the wager is newly received, an allocation of the wager to the determined outcomes is, at this point, NULL, leading to the "YES" branch of decision point 330. Accordingly, at step 370, the system and method may allocate the wager across all favorable outcomes to obtain a set of diminutive point spread wagers for the straight wager. Pool 120 may contain a collection of sets of diminutive point spread wagers, including the set corresponding to the newly received straight wager.

Payout odds for different ones of the outcomes may vary due to a heavy volume of betting or large wagers that have been made on specific point spreads. Accordingly, the system may, at step 330, determine whether the outcomes in the set of diminutive point spread wagers all have the same payout. If the outcomes in the set of diminutive point spread wagers have an equal payout, platform 110 may proceed to step 340. If the outcomes in the set of diminutive point spread wagers do not have an equal payout, the system and method may proceed again to step 370, where the wager is reallocated. After each performance of step 370, the system and method may proceed again to decision point 330 to determine whether the outcomes would provide equal payouts in view of the latest reallocation.

Allocation of the newly obtained wager to the various favorable outcomes to which it corresponds may cause a shift in odds that affects prior placed wagers, whether the prior placed wagers are straight wagers or point spread wagers, e.g., that correspond to a plurality of predefined atomic point spread wagers. Accordingly, subsequent to step 370, the system and method may initially perform step 380 to set (if not already set) an internally stored flag indicating that a new iteration, during which to traverse all placed wagers to ensure that their respective corresponding sets of favorable outcomes produce equal payouts for the respective placed wagers, is to be performed.

Additionally, after it is determined at decision point 330, for the newly placed wager, that the allocation is such that the favorable outcomes produce for the newly placed wager equal payouts, the system and method may determine, at step 350, that the flag has been set, and therefore, return to step 320 to obtain from memory a stored set of outcomes and diminutive point spread wagers corresponding to another recorded wager to similarly determine, at step 330, for the previously placed wager, whether the allocation of the wager to its respective set of favorable outcomes produces equal payouts. It is noted, that during a repeat performance of step 320 for a wager, the system need not re-determine which outcomes correspond to the wager, as they may already be recorded in memory, and may be retrieved from memory.

This may be repeated for all of the previously placed wagers. If, at step 340, the system determines that the final wager and corresponding set has been traversed, the system may determine whether the flag has been set in step 350. If the flag has been set, this indicates that a reallocation was performed in the latest traversal through the placed wagers, requiring a new traversal. Accordingly, the system may, at step 360, clear the flag and return to step 320, to begin a new iteration. If a reallocation (or a significant reallocation) does not take place in the next iteration, then the flag will not be reset in the next iteration, and, so that after the final set of that next iteration is traversed, as determined at step 340, the system may end the process, since the equilibrium has been reached. The iterative process may be restarted for each newly received wager during the betting period.

It is noted that in an example embodiment, the system may be configured such that step 380 is not performed upon an allocation for a newly placed wager in a first traversal through the wagers, because if none of the prior recorded wagers are reallocated based on the allocation of the newly placed wager, then there is no reason to perform a subsequent iteration through the recorded wagers.

Additionally, it is noted that, while the steps of FIG. 3 have been described as being performed immediately in response to receipt by the system of a wager, some or all of the steps may be performed instead at set periodic intervals and/or after receipt of a predefined number of wagers or of wagers specifying in total at least a predefined number of currency value units, and/or upon closing of the betting window, as described above with respect to FIG. 2.

It is noted that, while FIG. 3 has been discussed with respect to a newly placed straight wager, the process described with respect to FIG. 3 may similarly be performed for a newly placed point spread wager that corresponds to more than one predefined atomic point spread wager type to which placed wagers are allocated.

For example, continuing the example above regarding the game between the Lakers and the Suns, in an example embodiment of the present invention, the system and method may accept a wager that a team will win by at least a specified margin of victory. For example, the wager may specify that the Suns will win the game by at least 28 points. The system and method may allocate portions of the wager to one or more of the defined outcomes that correspond to the specified point spread, in this case, for example, outcomes 1, 2, and 3, according to the same method described above with respect to FIG. 3.

In a further example embodiment, the present invention may allow for the combination of different types of betting in a single pool. For example, in the game between the Lakers and the Suns (see Table 3), bettors may place wagers on the point spread as well as the total combined points scored in the game. Thus, the resulting number of outcomes may be the number of point spread options multiplied by the number of presented options for combined score in the game. A bettor who selects only the point spread between the Suns and Lakers, but does not make a wager dependent on the total points scored in the game, may find the bet for a specific point spread allocated across all the possible outcomes for that specific point spread with the varying options for total points. This may function similar to the example embodiment where a bettor may desire to place a wager on a single event, but has the bet allocated on all favorable outcomes of that single event with multiple event bets, as described above.

In an example embodiment of the present invention, the system and method may accept limit bets, where the bettor sets a limit (e.g., a minimum) on the odds for a placed wager. The system and method may include the wager in the pool as long as the odds meet the specified limit and may pull the wager from the pool where the odds do not meet the specified limit. As noted above, as long as the betting window during which a wager may be placed by a user is open, the odds for any outcome may shift. Therefore, a limit bet may be entered into and removed from the pool numerous times while the betting window is open. The system and method may maintain a data store in which to store placed wagers that are not in the pool because the limits set by the wagers are not met. The conditions for the extent to which placed wagers are filled in view of current odds and placed odds may be as those described in the ’656 application.

In an example embodiment, where limit betting is accepted, in an instance where there is no satisfaction of the odds specified by a bettor where the wager is fully filled, the system may fill only a portion of the wager that does satisfy the odds (“partial fill” of a wager). In such an instance, the remainder of the wager may be excluded from the pool, and only the partially filled wager may be allocated across the favorable outcomes. The portion of the wager not bet, may be maintained in the data store. When new bets are placed, the odds may shift, and the portions of the wagers not bet may therefore be checked to see if they may be allocated with satisfaction of the specified odds. Any portions of the wagers not previously allocated for inclusion in the pool, which are subsequently determined to be allocatable while satisfying the specified odds, may be allocated across the favorable outcomes in the pool. Similarly, the newly placed wager may cause a shift in odds such that previously filled portions of a prior placed wager are removed in order to meet the limit odds set by the prior placed wager.

Similar to that described above with respect to FIGS. 2 and 3, whenever the body of wagers changes, whether by adding a wager to the pool or removing a wager from the pool, odds may shift for any of the outcomes. Therefore, if a wager is pulled in response to a shift of odds to a new odds that does not meet the limit set by the wager, the pulling of the wager may change odds of yet another wager in the pool so that the limit set by the other wager is also no longer met, thereby requiring its removal. Therefore, in response to each addition of a wager to the pool and removal of the wager from the pool, the system and method may traverse all of the recorded wagers of the pool and those of the placed wagers not in the pool due to the set wager limits, to determine whether the odds meet the wager limits. This may be performed for portions of placed wagers, as indicated above, and, for a particular placed wager, the size of the portion added to the pool may vary as the odds shift. This may be iteratively performed as the removal of wagers from and addition of wagers to the pool in each iteration may require still other changes with respect to whether wagers traversed in the previous iteration are to be included in the pool. The system and method may perform iterations until an equilibrium is achieved. Equilibrium is found where the allocation amounts for each of the wagers in the respective diminutive sets containing the new wager remain unchanged (or substantially unchanged) in sequential iterations, and where the amount of the money in the pool with respect to limit bets is maximized Example embodiments of the present invention, may provide, in combination with any of the above-described methods, e.g., as illustrated with respect to FIGS. 2 and 3, for a wagering association to enter bets for each of the defined fundamental outcomes, to which or to combinations of which subsequently placed wagers accepted by the wagering association may correspond. In an example embodiment, the wagering association places such “opening bets” prior to accepting any wagers by other parties. The opening bets may be placed as described in section 15.2.3 of the ’656 application. Thus, the system and method of the present invention may provide for recording respective first fundamental bets on all of the plurality of fundamental outcomes by a single party.

The above description is intended to be illustrative, and not restrictive. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings and specification.

What is claimed is:

1. A computer-implemented method for pooling in a single pool both single and multiple event wagers, the method comprising:

(a) for each of a plurality of favorable outcomes corresponding to a single event wager, each favorable outcome specifying results for multiple events, determining, by a computer processor, a respective portion of an amount wagered by the single event wager, such that a return on the respective portions for each of the favorable outcomes is the same;

(b) allocating, by the processor, the determined portions of the wager amount to the respective favorable outcomes; and (c) iteratively re-performing steps (a) and (b) for a plurality of wagers in the single pool until an equilibrium, where, between two sequential ones of the iterations, reallocation of portions of the amounts wagered is not required for any of the wagers in the single pool.

2. The method according to claim 1, wherein, for step (a), the processor performs an iterative calculation in which the single event wager is initially allocated based on a degree of similarity between odds of different ones of the favorable outcomes, and in which the allocation is subsequently iteratively modified until a same return is calculated for each of the favorable outcomes.

3. The method according to claim 2, wherein, when a new wager corresponding to the same favorable outcomes to which the single event wager corresponds is received, the allocation of the single event wager is used by the processor, in the iterative calculation, for initially allocating the new wager to the favorable outcomes.

4. The method according to claim 3, wherein, when the new wager is placed, the single event wager is reallocated to the favorable outcomes.

5. The method according to claim 2, wherein a rapidity of performance of the iterative calculation is dependent on a proximity of the initial allocation to a final allocation of the iterative calculation.

6. The method according to claim 1, wherein step (a) includes performance of an iterative calculation in which the allocation is iteratively modified until a same return is calculated for each of the favorable outcomes.

7. The method according to claim 6, wherein step (a) includes initially allocating the single event wager uniformly to all of the plurality of favorable outcomes, the allocation being subsequently iteratively modified.

8. The method according to claim 1, further comprising:

initially determining whether allocation of equal portions of the single event wager to each of the favorable outcomes provides different returns on the single event wager depending on which of the favorable outcomes occurs, the wager amount of the single event wager being equally allocated to each of the favorable outcomes if it is determined that different returns would not be provided for the different favorable outcomes.

9. The method according to claim 1, wherein the wagers of the single pool include sports wagers.

10. The method according to claim 1, wherein the single event wager is only partially filled to satisfy specified limit odds.

11. The method according to claim 10, wherein only a portion of the single event wager is allocated by the processor to the respective set of favorable outcomes.

12. The method according to claim 11, wherein a remainder of the single event wager not allocated to the respective set of favorable outcomes is recorded in a data store as being unfilled.

13. The method according to claim 12, wherein, when new bets are added to the pool, one of (a) the remainder of the single event wager and (b) a portion of the remainder of the single event wager is allocated by the processor to the respective set of favorable outcomes if the specified limit odds are satisfied with the allocation of the one of (a) the remainder and (b) the portion of the remainder.

14. A computer-implemented method for processing a parimutuel wager that one of two possible outcomes will occur, at least a portion of the parimutuel wager being entered into a pool with other wagers, the method comprising:

allocating, by a computer processor, portions of the wager to a plurality of favorable outcomes of the wager, which wager corresponds to the one of the two possible outcomes;

wherein:

the allocating includes an iterative allocation, each iteration of the iterative allocation except for a last iteration reallocating wager amounts of one or more of the wagers in the pool to a respective set of favorable outcomes; and the iterative allocation is performed until an equilibrium is reached, in which, for each of the wagers of the pool, a return on the respective wager is the same regardless of which of the respective set of favorable outcomes occurs.

15. The method according to claim 14, where straight wagers and point spread wagers are aggregated in the pool.

16. The method according to claim 15, where the set of favorable outcomes for a straight wager of the pool includes a plurality of point spread outcomes.

17. The method according to claim 14, where the wagers of the pool include sports wagers.

18. The method according to claim 14, wherein the allocating includes initially allocating the parimutuel wager based on a degree of similarity between odds of different ones of the favorable outcomes, and subsequently iteratively modifying the allocation of the parimutuel wager until the return on the parimutuel wager is calculated as being the same regardless of which of the respective set of favorable outcomes occurs, the processor determining whether the payout for the parimutuel wager for each of the favorable outcomes is equal in each of the iterations.

19. The method according to claim 18, wherein, when a new wager corresponding to the same favorable outcomes to which the parimutuel wager corresponds is received, the allocation of the parimutuel wager is used by the processor for initially allocating the new wager to the favorable outcomes.

20. The method according to claim 19, wherein when the new wager is placed, the parimutuel wager is reallocated to the favorable outcomes.

21. The method according to claim 14, wherein the allocating includes performing an initial allocation of portions of the parimutuel wager to the plurality of favorable outcomes, and a rapidity of performance of the iterative calculation is dependent on the proximity of the initial allocation to a final allocation of the iterative calculation.

22. The method according to claim 14, wherein the parimutuel wager is only partially filled to satisfy specified limit odds, and the equilibrium is reached upon satisfaction of a further condition that the portions of limit bets entered into the pool are maximized.

23. The method according to claim 22, wherein only a portion of the parimutuel wager is allocated by the processor to the respective set of favorable outcomes.

24. The method according to claim 23, wherein a remainder of the parimutuel wager not allocated to the respective set of favorable outcomes is recorded in a data store.

25. The method according to claim 24, wherein, when a new bet is added to the pool, one of (a) the remainder of the parimutuel wager and (b) a portion of the remainder of the parimutuel wager is allocated by the processor to the respective set of favorable outcomes if the specified limit odds are satisfied with the allocation of the one of (a) the remainder and (b) the portion of the remainder.

26. A parimutuel betting system, comprising: a computer terminal configured to receive single event wagers and multiple event wagers from a plurality of remote terminals, wherein the computer terminal includes a processor configured to:

(a) pool portions of the single event wagers and the multiple event wagers in a single pool; and (b) for a received single event wager:

(i) for each of a plurality of favorable outcomes corresponding to the single event wager, each favorable outcome specifying results for multiple events, determine a respective portion of an amount wagered by the single event wager, such that, a return on the respective portions for each of the favorable outcomes is the same;

(ii) allocate the determined portions of the wager amount to the respective favorable outcomes; and (iii) subsequent to performance of step (ii), iteratively re-perform steps (i) and (ii) for a plurality of wagers in the single pool until an equilibrium is achieved, where, between two sequential ones of the iterations, reallocation of portions of the amounts wagered is not required for any of the wagers in the single pool.

27. A parimutuel betting system, comprising: a computer terminal configured to receive parimutuel wagers having one of two possible outcomes occurring, from a plurality of remote terminals, wherein the computer terminal includes a processor configured to:

(a) pool portions of straight wagers and point spread wagers in a single pool; and (b) for a received single straight wager:

(i) for each of a plurality of favorable point spread outcomes corresponding to the straight wager, each favorable point spread outcome corresponding the one of the two possible outcomes, determine a respective portion of an amount wagered by the straight wager, such that, a return on the respective portions for each of the favorable point spread outcomes is the same;

(ii) allocate the determined portions of the wager amount to the respective favorable point spread outcomes; and (iii) subsequent to performance of step (ii), iteratively re-perform steps (i) and (ii) for a plurality of wagers in the single pool until an equilibrium is achieved, where, between two sequential ones of the iterations, reallocation of portions of the amounts wagered is not required for any of the wagers in the single pool.

* * * * *